United States Patent [19]
Sano et al.

[11] 3,775,583
[45] Nov. 27, 1973

[54] DEVICE FOR INTERCONNECTING PLATES BETWEEN ADJACENT CELLS OF STORAGE BATTERY

[75] Inventors: Ichiro Sano, Kanagawa-ken; Sinji Karasawa, Fujisawa; Tetsuo Sakurai, Odawara-shi, all of Japan

[73] Assignee: Matsushita Electric Industrial Co., Ltd., Kadoma-shi, Osaka-fu, Japan

[22] Filed: May 24, 1972

[21] Appl. No.: 256,333

[30] Foreign Application Priority Data
May 26, 1971 Japan.............................. 46/36530

[52] U.S. Cl............................... 219/127, 219/150 V
[51] Int. Cl............................................. B23k 9/16
[58] Field of Search..................... 219/127, 125, 75, 219/150 V

[56] References Cited
UNITED STATES PATENTS
3,476,908  11/1969  Frindel................................ 219/127

| | | | |
|---|---|---|---|
| 3,299,249 | 1/1967 | Sciaky | 219/127 X |
| 3,437,785 | 4/1969 | Sciaky | 219/127 X |
| 3,015,022 | 12/1961 | Bowers | 219/127 |
| 3,301,996 | 1/1967 | Bidwell | 219/127 |

Primary Examiner—Thomas J. Kozma
Attorney—Milton J. Wayne et al.

[57] ABSTRACT

A device for interconnecting plates between the adjacent cells of a storage battery is provided which comprises a pair of welding jig members for holding a pair of connector lugs disposed in the adjacent cells respectively and pressing them against a partition wall between the adjacent cell chambers, and an arc welding torch mounted on one of the pair of connector lug holding and pressing members. In operation, the arc is established between the electrode and a projection of one of the pair of connector lugs extended through an aperture of this partition wall and fitted into an aperture of the other connector lug, whereby the pair of connector lugs are fused and joined together.

8 Claims, 4 Drawing Figures

3,775,583

PATENTED NOV 27 1973

DEVICE FOR INTERCONNECTING PLATES BETWEEN ADJACENT CELLS OF STORAGE BATTERY

BACKGROUND OF THE INVENTION

The present invention relates to a device for interconnecting plates between the adjacent cells of a storage battery with a pair of connector lugs one of which has a projection extended through an aperture in a partition wall between the adjacent cell chambers formed integral with a storage container and fitted into an aperture in the other connector lug.

There has been proposed the intercell connection and method of making same as disclosed in the U.S. Pat. Nos. 3,313,659 and 3,476,611 in which the cell elements in the adjacent cells of the so-called monoblock type storage battery having a plurality of partition walls to define the cell chambers are mechanically and electrically connected to each other through the apertures or openings in the partition walls. A pair of connector lugs are pressed against each other by a pair of holding members or jaws which also serve as electric conducting members so that the current flows through the projections of the pair of connector lugs to produce the heat to weld the projections. Therefore, the pair of connector lugs are welded together with the partition wall interposed therebetween, but the heating effect upon the partition wall adversely affects the portion adjacent to the aperture in the partition wall. Furthermore, there is still another disadvantage that the heat generated by the current passing through the projections is not uniform depending upon the shapes and especially the contact surface conditions thereof.

SUMMARY OF THE INVENTION

According to the present invention, the pressure is exerted to a pair of connector lugs when they are welded together, but unlike the conventional intercell connection method in which the resistance welding is used, the nonconsumable-electrode, inert gas arc welding is used. An electrode is disposed in closely spaced apart relation with a projection of one of a pair of connector lugs in the adjacent cells, respectively, which is extended through an aperture in a partition wall between the adjacent cell chambers and fitted into an aperture in the other connector lug, so that the arc between the projection and the electrode may be concentrated. Therefore, the pair of projections may be instantaneously fused and joined together without causing the deterioration of the portion adjacent to the apertures in the partition walls by the thermal and heating effects.

According to one aspect of the present invention, a pair of welding jig members for holding a pair of connector lugs and pressing them against the partition wall and toward each other (which will be referred to as "a pair of pressure members" for brevity in this specification) and an arc welding torch are provided as a unitary construction so that they may be easily inserted into a narrow cell chamber in a storage battery. Therefore, the pair of connector lugs which may be air-tightly held by the pair of pressure members can be welded together in one step.

Figure 1:
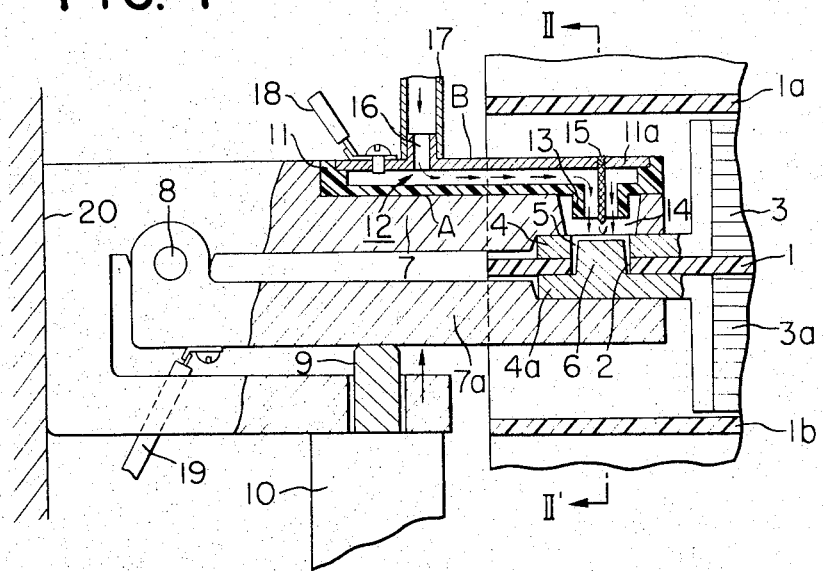
FIG. 1 is a schematic sectional view of a device of the present invention for interconnecting plates between the adjacent cell chambers of a storage battery.
Figure 2:
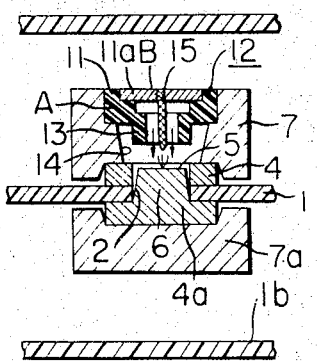
FIG. 2 is a sectional view taken along the line II—II of FIG. 1.
Figure 3:
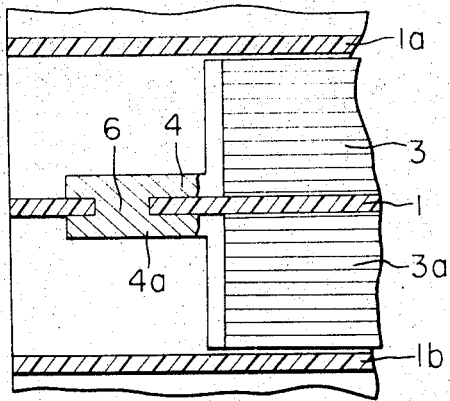
FIG. 3 is a sectional view illustrating the welded connector lugs between the adjacent cell chambers.

DESCRIPTION OF THE PREFERRED EMBODIMENT:

Referring to FIGS. 1, 2 and 3, a storage battery comprises a container having a plurality of partition walls 1, 1a and 1b formed integral with the container to define a plurality of cell chambers. In general, the container and its partition walls are made of plastic such as polypropylene, acrylonitrile-styrene (AS), acrylonitrile-butadiene-styrene (ABS) or ebonite. Each of the partition walls 1, 1a and 1b has an aperture 2 for passing therethrough a connector lug. A battery element 3 in which the positive and negative plates alternate is mounted in each of the cell chambers. A pair of conducting connector lugs 4 and 4a are formed integral with straps of the battery elements 3 and generally made of a lead alloy. When a pair of the conducting lugs 4 and 4a are disposed adjacent to each other with the partition wall 1 interposed therebetween, one of the conducting lugs for example 4 is connected to the positive plates whereas the other 4a, to the negative plates.

The conducting lug 4 has an aperture coaxial with the aperture in the partition wall 1, whereas the other conducting lug 4a has a slightly tapered short projection 6 formed integral with the lug 4a and fitted into the apertures 2 and 5 of the partition wall 1 and the lug 4. The mechanical and electrical connection between the pair of connector lugs 4 and 4a which are spaced apart from each other by the partition wall 1 can be made by the following steps.

First the projection 6 of the connector lug 4a is extended through the aperture 2 of the partition wall 1 and fitted into the aperture 5 of the lug 4. In this case, the outer diameter of the projection 6 is so selected as to be slightly smaller than the inner diameters of the apertures 2 and 5 in order to facilitate the fitting, and the length of the projection 6 is so selected as to make the end face of the projection 6 coplanar with the side surface of the connector lug 4 which does not contact the partition wall 1 or to locate the end of the projection 6 in the aperture 5 in slightly spaced apart relation from the surface of the connector lug 4. Next a pair of welding jig members 7 and 7a made of a metal such as steel are inserted into the pair of cell chambers partitioned by the wall 1 so as to press the pair of conducting lugs 4 and 4a against the partition wall 1. According to the present invention, one pressure member 7a is pivoted with a pivot pin 8 to the other pressure member 7, and is operatively coupled to a piston 9 of a hydraulic or pneumatic power cylinder 10 so that when the latter is actuated, the pressure member 7a may firmly press the pair of connector lugs 4 and 4a against the partition wall 1.

The pressure exerted on the pair of connector lugs 4 and 4a in order to press them against the partition wall 1 is determined depending upon the thicknesses of the partition walls and connector lugs which in turn are dependent upon the capacity of storage batteries. For example, pressure of the order from 200 kg/cm² to 600 kg/cm² is sufficient for pressing the connector lugs against the partition wall when no air-tight or liquid-tight gasket is used. On the other hand when the air-tight or liquid-tight gaskets are used between the cell chambers, pressure less than 200 kg/cm² is sufficient.

Upon the stationary welding jig member 7 is disposed an inert gas discharge tube generally denoted by 12 comprising a portion A made of an electrically insulating member such as ceramic 11 having an excellent resistance to heat and an electrically conducting portion B made of a metal member 11a such as copper or brass in order to supply the power to a welding electrode as well be described in more detail hereinafter. An inert gas discharge nozzle 13 which is projecting downwardly from the end of the insulating member 11 is located in an aperture 14 formed through the leading end of the stationary welding jig member 7. A tungsten welding electrode 15 is screwed to the conducting portion B and is located along the axis of the nozzle 13. The leading end of the welding electrode 15 is sharply pointed so that the arc may be concentrated in operation. An inert gas under pressure such as argon is introduced into the inert gas discharge tube 12 through a hose 17 and an inlet 16 from an inert gas container (not shown).

One end of an electrode cable 18 is fixed to the conducting portion B of the gas discharge tube 12 and the other end is coupled to a plasma spot welding machine. One end of a grounding cable 19 is fixed to the movable pressure member 7a and the other end is coupled to the plasma welding machine. The stationary welding jig member 7 is mounted on a support 20.

Figure 4:
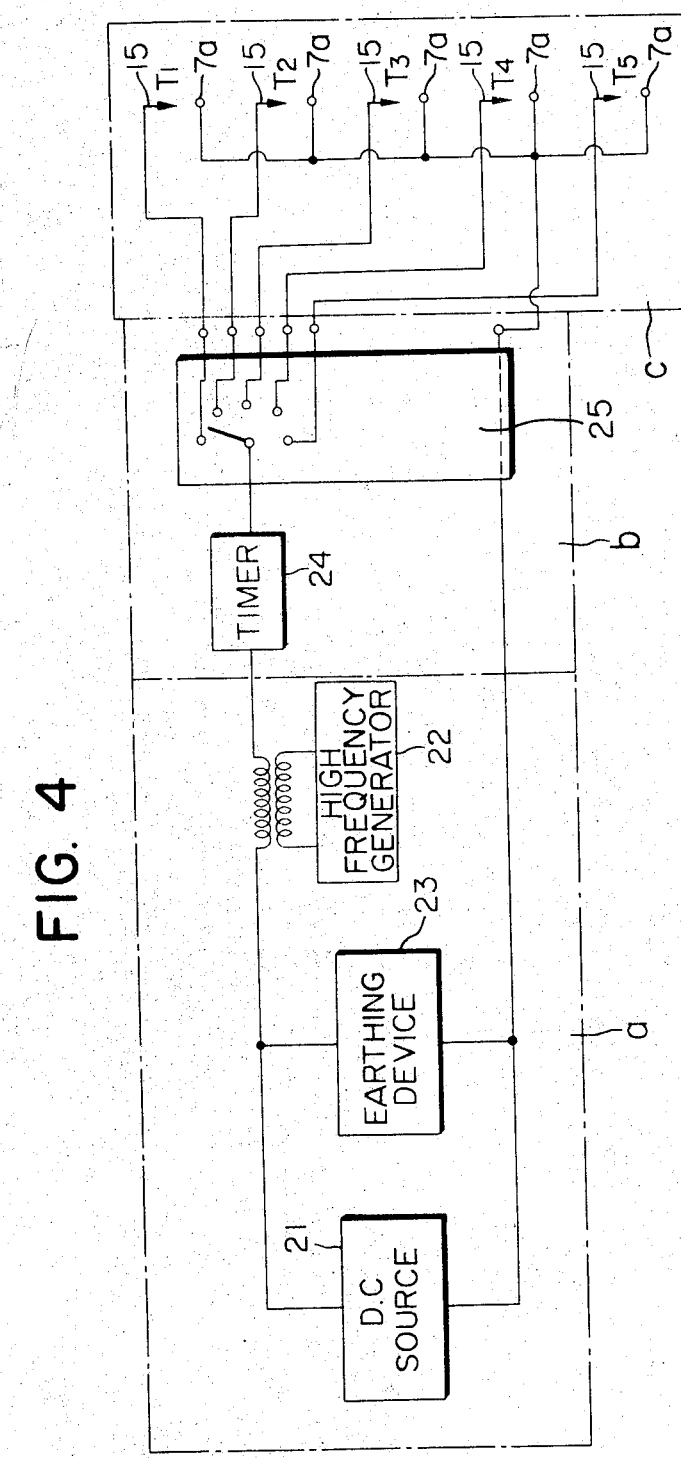
FIG. 4 is an electric circuit diagram of a welding machine adapted for sequentially welding a plurality of pairs of connector lugs.

Next referring to FIG. 4, the plasma spot welding machine comprises three sections. The first section is a power section a which comprises a DC power source 21 with the current capacity of 80 – 200 amperes; a high frequency oscillator 22 capable of generating a high frequency of about 3 MHz; and a high frequency earthing device 23. The second section is a power supply switching device comprising a timer 24 for controlling a time interval for supplying the current to the welding electrode, and a switching circuit 25 for sequentially switching the current supplies to a plurality of welding electrodes. The third section comprises a plurality of torches c each including the welding electrode 15 of the type described above. In FIG. 4, five torches $T_1 - T_5$ are shown because in the conventional 12 volt storage batteries, there are six cell chambers defined by five partition walls, thus requiring five welding operations. In each torch $T_1 - T_5$, the arc is directed from the electrode 15 toward the movable pressure member 7a which presses the connector lug 4a having the projection 6 against the partition wall 1 and toward the connector lug 4.

Referring back to FIGS. 1 and 2, the pair of stationary and movable pressure members 7 and 7a are used to press the pair of connector lugs 4a and 4 against the partition wall 1. The power cylinder 10 is actuated so that the piston 9 moves upwardly to cause the movable welding jig member 7a to move toward the stationary welding jig member 7. Therefore, the pair of connector lugs 4 and 4a are pressed against the partition wall 1 between the pair of pressure members 7 and 7a.

Thereafter, the inert gas under controlled pressure and with a predetermined flow rate is introduced into the gas discharge tube or electrode holder 12 through the inert gas hose 17 and the inlet 16, and is discharged through the nozzle 13 toward the projection 6 of the connector lug 4a. Next by the plasma spot welding machine the high frequency, high DC voltage is applied across the electrode 15 and the movable welding jig member 7a so that the arc may be maintained between the electrode 15 and the projection 6 of the connector lug 4a. Since the inert gas issuing from the nozzle 13 cools the arc, the latter is very sharply converged so that a portion of the inert gas is highly ionized. That is, the plasma is created, so that the high temperature ranging from 5,000° K to 10,000° K may be maintained. As a result, the periphery of the aperture 5 of the connector lug 4 and the projection 6 of the connector lug 4a are instantaneously fused under a high temperature so that they may be firmly joined together. In this case, the very short arc duration between 0.06 seconds and 0.3 seconds is sufficient to attain the desired joint between the pair of connector lugs 4 and 4a.

Since the movable welding jig member 7a on the side of the connector lug 4a having the projection 6 is grounded, the arc may be stabilized. Since the argon gas completely covers the welding zone, the oxidization of the connector lugs in welding operation may be positively prevented.

When the pair of connector lugs 4 and 4a have been joined together, the welding machine is deactivated to stop the supply of the inert gas, and thereafter the pair of pressure members 7 and 7a are released from the pair of joined connector lugs 4 and 4a and then removed out of the battery container.

The end portions of the pair of pressure members 7 and 7a are recessed as shown in FIGS. 1 and 2 so that they may easily receive the connector lugs 4 and 4a when inserted into the storage battery container and press them against the partition wall with uniform pressures. Furthermore, the air-tightness of the welding zone may be maintained in operation.

The intercell electrical connections may be accomplished one by one by cycling the above described holding or pressure application step in which a pair of connector lugs are pressed against the partition wall by the pair of welding jig members and welding step, but from the standpoint of production efficiency it is preferable that all of the pairs of the connector lugs in each battery container are simultaneously pressed against the partition walls and the supply of the welding current and/or the inert gas to the welding torches $T_1 - T_5$ (See FIG. 4) is switched so that the pairs of connector lugs may be sequentially welded together. For this purpose the present invention provides the switching circuit 25 (See FIG. 4) so that the supply of the welding current to the torches may be switched for example in the order of $T_1, T_2, T_3, T_4$ and $T_5$. Hence the efficiency of welding operation may be much enhanced. Furthermore, the arc duration may be controlled by the timer 24 for the best results depending upon the thickness of connector lugs.

Next one example of the present invention will be described in which the intercell electrical connections of an automobile storage battery with a container and five partition walls formed integral therewith and with an output of 12 volts and an ampere-hour capacity of 40 AH were made by the device of the present invention.

The battery construction was substantially smilar to that shown in FIGS. 1 and 2, and the thickness of the partition walls was 1.5 mm. The projection was about 10 mm in diameter and in such a length that its free end was substantially coplanar with the side surface of the connector lug when fitted into the aperture thereof as shown in FIGS. 1 and 2. A pressure of 200 kg/cm$^2$ was exerted on the pair of connector lugs by the pair of pressure members. The inert gas or argon was discharged through the nozzle at a flow rate of 5 – 15 l/minute. The DC current of 180 – 200 amperes was used. The pair of connector lugs were firmly joined together by the arc which lasted only for 0.2 seconds.

In the instant embodiment, the welding jig member 7 has been shown as being stationary whereas the pressure member 7a, as being movable, but it should be understood that both welding jig members 7 and 7a may be movable like a pair of pliers so that they may be moved toward or away from the partition wall.

The diameter of and the spacing between the tungsten electrode and the projection of the connector lug may be appropriately selected depending upon the thicknesses of the partition walls and of the connector lugs.

In summary, in the plasma spot welding machine in accordance with the present invention, a pair of connector lugs for intercell electrical connection between the adjacent battery elements in the adjacent cell chambers of a storage battery are pressed against the partition wall by a pair of pressure member one of which is movable relative to the other and held airtightly between the pair of welding jig members and the partition wall. Thereafter, the arc is established between the electrode and the projection of one of the pair of connector lugs so that the latter may be firmly joined together almost instantaneously. In this case, the arc is completely covered with the inert gas and is very sharply converged or concentrated so that the free end of the projection of one of the pair of connector lugs may be almost instantaneously fused and joined to the fused periphery of the aperture of the other connector lug. In this case, the partition wall interposed between the pair of connector lugs will not be adversely affected by the high temperature. Hence the thermal and heating effects upon the joint between the pair of connector lugs made by the device of the present invention is less as compared with the resistance welding in which the pieces of metal are joined by the Jourle's heat produced when a large current flows through them.

Furthermore, the present invention provides the pair of pressure members and the torch as a unitary construction so that the device in accordance with the present invention becomes compact in size and simple in operation. The pair of pressure members may be easily inserted into the cell chambers even when the width thereof is of the order of 20 – 40 mm.

As described above, according to the present invention the intercell electrical connections for multicell batteries may be accomplished in a very simple yet very efficient manner by the device in which the pair of pressuree members and the welding torch are provided as a unitary construction compact in size.

We claim:

1. A device for interconnecting plates between adjacent cells of a storage battery wherein a first connector lug has an aperture aligned with an aperture in a partitioned wall of the battery and a second connector lug has a projection extending through the aperture in the wall and into the aperture in the first connector lug; said device comprising a welding jig member having first and second jig members hinged together to form first and second pressure members positioned to engage said first and second lugs respectively, means for urging said pressure members toward each other, and welding torch means in said first pressure member, said torch means comprising an inert gas discharge tube having an insulating wall portion affixed to said first pressure member and a conductive wall portion separated from said first pressure member, a nozzle aperture in said pressure member extending into said discharge tube through said insulating wall portion and positioned for alignment with said projection, and a welding electrode affixed to said conductive wall portion and extending axially in said nozzle aperture.

2. The device of claim 1 wherein said gas discharge tube extends longitudinally along said first pressure member transversely of said nozzle aperture.

3. The device of claim 1 wherein said welding electrode is removably screwed into said conductive wall portion.

4. The device of claim 1 in which said nozzle aperture extends transversely of said inert gas discharge tube, further comprising an insulating nozzle extending into said nozzle aperture from said insulating wall portion.

5. The device of claim 1 wherein said means for urging said pressure members toward each other comprises power cylinder means coupled to said welding jig member.

6. The device of claim 1 wherein said first pressure member is a stationary member, and further comprising inert gas inlet means connected to said gas tube, and means connected between said welding jig member and said conductive wall portion for establishing an arc between said welding electrode and projection.

7. The device of claim 1 wherein said first and second pressure members have recesses to engage said first and second connector lugs respectively.

8. The device of claim 1 wherein said insulating wall portion is affixed to extend longitudinally in a longitudinally extending groove in said first pressure member, said conductive wall portion is affixed to said insulating wall portion to extend longitudinally therewith, and said nozzle aperture extends transversely into said tube through said insulating wall portion, further comprising a gas inlet extending into said gas discharge tube and longitudinally spaced from said nozzle aperture.

* * * * *